(12) United States Patent
Hayamizu et al.

(10) Patent No.: US 12,537,151 B2
(45) Date of Patent: Jan. 27, 2026

(54) ELECTRICAL APPARATUS, FILING APPARATUS AND STORAGE APPARATUS

(71) Applicant: AGC Inc., Tokyo (JP)

(72) Inventors: Hiroki Hayamizu, Chiyoda-ku (JP); Tamaki Chinsoga, Chiyoda-ku (JP); Masato Fukushima, Chiyoda-ku (JP)

(73) Assignee: AGC Inc., Tokyo (JP)

( * ) Notice: Subject to any disclaimer, the term of this patent is extended or adjusted under 35 U.S.C. 154(b) by 224 days.

(21) Appl. No.: 18/333,912

(22) Filed: Jun. 13, 2023

(65) Prior Publication Data

US 2023/0326693 A1 Oct. 12, 2023

Related U.S. Application Data

(63) Continuation of application No. PCT/JP2021/045912, filed on Dec. 13, 2021.

(30) Foreign Application Priority Data

Dec. 16, 2020 (JP) ................. 2020-208467

(51) Int. Cl.
*H01H 11/00* (2006.01)
*H01H 33/22* (2006.01)
*H01H 33/56* (2006.01)

(52) U.S. Cl.
CPC ............ *H01H 33/56* (2013.01); *H01H 11/00* (2013.01); *H01H 33/22* (2013.01); *H01H 2033/566* (2013.01); *H01H 2223/002* (2013.01)

(58) Field of Classification Search
CPC .. H01H 33/22; H01H 33/56; H01H 2033/566; H01H 2223/002; H01H 11/00; H02B 13/045; H02B 13/055; H01B 3/56
(Continued)

(56) References Cited

U.S. PATENT DOCUMENTS 7,990,687 B2 * 8/2011 Yoshimura ......... H02B 13/0356
361/603
8,304,676 B2 * 11/2012 Uchii .................... H01H 33/56
218/85
(Continued)

FOREIGN PATENT DOCUMENTS

CN 208241179 U 12/2018
CN 111211515 A 5/2020
(Continued)

OTHER PUBLICATIONS

Translation of CN111211515 (Original document published on May 29, 2020) (Year: 2020).*
(Continued)

*Primary Examiner* — William A Bolton
(74) *Attorney, Agent, or Firm* — Oblon, McClelland, Maier & Neustadt, L.L.P.

(57) ABSTRACT

An electrical apparatus have a grounded tank with a conductor at an inside thereof, in which:
the inside of the grounded tank is filled with insulating arc-extinguishing gas;
the insulating arc-extinguishing gas is confined in the grounded tank by a sealing member;
the insulating arc-extinguishing gas includes at least one selected from the group consisting of a hydrofluoroolefin having 3 or 4 carbon atoms and a hydrochlorofluoroolefin having 3 or 4 carbon atoms; and
the sealing member includes at least one selected from the group consisting of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber,
(Continued)

a tetrafluoroethylene-perfluorovinylether based rubber and a polytetrafluoroethylene.

9 Claims, 4 Drawing Sheets

(58) Field of Classification Search
USPC ..... 218/1, 13, 45, 55, 67, 68, 79, 80, 85, 90
See application file for complete search history.

(56) References Cited

U.S. PATENT DOCUMENTS

| | | | |
|---|---|---|---|
| 10,043,621 B2* | 8/2018 | Kainaga | H02G 5/065 |
| 10,505,349 B2* | 12/2019 | Di-Gianni | C09K 3/10 |
| 10,770,198 B2* | 9/2020 | Kieffel | G05D 16/20 |
| 2011/0127237 A1 | 6/2011 | Uchii et al. | |
| 2011/0226503 A1* | 9/2011 | Bolin | H01B 3/56 |
| | | | 174/28 |
| 2018/0141893 A1 | 5/2018 | Lamanna et al. | |
| 2018/0247779 A1 | 8/2018 | Rached | |
| 2018/0264303 A1 | 9/2018 | Robin et al. | |
| 2019/0372318 A1* | 12/2019 | Kawano | H02G 5/065 |
| 2020/0294742 A1 | 9/2020 | Kuschel et al. | |
| 2020/0365353 A1 | 11/2020 | Rached | |
| 2020/0388412 A1* | 12/2020 | Smith | H01B 3/56 |

FOREIGN PATENT DOCUMENTS

| | | |
|---|---|---|
| EP | 3 832 818 A1 | 6/2021 |
| JP | 8-273462 A | 10/1996 |
| JP | 2000-59935 A | 2/2000 |
| JP | 2009-289566 A | 12/2009 |
| JP | 2017-140793 A | 8/2017 |
| JP | 2018-525327 A | 9/2018 |
| JP | 2020-22253 A | 2/2020 |
| JP | 2020-514493 A | 5/2020 |

OTHER PUBLICATIONS

International Search Report issued Feb. 8, 2022 in PCT/JP2021/045912 filed on Dec. 13, 2021 3 pages.

* cited by examiner

ELECTRICAL APPARATUS, FILING APPARATUS AND STORAGE APPARATUS

CROSS-REFERENCE TO RELATED APPLICATIONS

This application is a Continuation of International Application No. PCT/JP2021/045912, filed Dec. 13, 2021, which claims priority to Japanese Patent Application No. 2020-208467 filed Dec. 16, 2020. Each of the above applications is hereby expressly incorporated by reference, in its entirety, into the present application.

TECHNICAL FIELD

The present disclosure relates to an electrical apparatus, a filling apparatus, and a storage apparatus.

BACKGROUND ART

Electrical apparatus such as gas-insulated switchgear has a grounded tank with a conductor at an inside thereof. Insulating arc-extinguishing performance is ensured by filling the atmosphere around the conductor in the grounded tank with an insulating arc-extinguishing gas.

Conventionally, $SF_6$, for example, has been known as an insulating arc-extinguishing gas used in such electrical apparatus. However, although $SF_6$ has high insulation arc-extinguishing performance, it has a large global warming potential (GWP). Therefore, from the viewpoint of reducing the environmental load, the use of hydrofluoroolefin (hereinafter also referred to as HFO) and hydrochlorofluoroolefin (hereinafter also referred to as HCFO) has being studied as an insulating arc-extinguishing gas to replace $SF_6$. Patent Document 1 states that an insulating gas containing HFO is useful for insulation arc-extinguishing.

RELATED ART DOCUMENTS

Patent Documents

Patent Document 1: Japanese Patent Application Laid-Open (JP-A) No. 2018-525327

SUMMARY OF INVENTION

Technical Problem

The insulating arc-extinguishing gas is confined in the grounded tank by a sealing member such as an O-ring. Depending on the kind of insulating arc-extinguishing gas, it may have some effect on sealing materials such as O-rings. As a result, insulation arc-extinguishing gas may leak from the grounded tank. If this happens, a pressure of the insulating arc-extinguishing gas in the grounded tank may decrease, and the insulating arc-extinguishing performance may deteriorate.

In addition, HFO and HCFO, which have high boiling points, are used by sometimes mixed with diluent gases such as He, Ar, $CO_2$, $O_2$, $N_2$, $N_2O$, $CH_4$ and air from the viewpoint of suppressing condensation and liquefaction in the usage environment. If the insulating arc-extinguishing gas exerts some influence on the sealing member such as O-ring, the insulating arc-extinguishing gas or the diluent gas may leak from the grounded tank. In a case in which, the composition of the mixed gas changes, which may lead to an increase in the condensation temperature of the mixed gas and a decrease in insulating arc-extinguishing performance.

An embodiment in the present disclosure has been made in view of the above problems, and aims to provide an electrical apparatus in which leakage of insulating arc-extinguishing gas from a grounded tank and influence on sealing members are reduced.

In addition, one embodiment in the present disclosure also aims to provide a filling apparatus for filling an insulating arc-extinguishing gas into a grounded tank of the electrical apparatus, and a storage apparatus for storing the insulating arc-extinguishing gas to be filled in the grounded tank of the electrical apparatus.

The present disclosure includes the following embodiments [1] to [12].

[1] An electrical apparatus including a grounded tank having a conductor at an inside thereof, in which:
  the grounded tank is filled inside with an insulating arc-extinguishing gas;
  an atmosphere around the conductor in the grounded tank is filled with the insulating arc-extinguishing gas;
  the insulating arc-extinguishing gas is confined in the grounded tank by a sealing member;
  the insulating arc-extinguishing gas includes at least one selected from the group consisting of a hydrofluoroolefin having 3 or 4 carbon atoms and a hydrochlorofluoroolefin having 3 or 4 carbon atoms; and
  the sealing member includes at least one selected from the group consisting of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber, a tetrafluoroethylene-perfluorovinylether based rubber and a polytetrafluoroethylene.

[2] The electrical apparatus according to [1], in which the insulating arc-extinguishing gas includes at least one selected from the group consisting of 1-chloro-2,3,3,3-tetrafluoropropene and 1,1,1,4,4,4-hexafluoro-2-butene.

[3] The electrical apparatus according to [1] or [2], in which the insulating arc-extinguishing gas further includes at least one diluent gas selected from the group consisting of He, Ar, $CO_2$, $N_2$, $O_2$, $N_2O$, $CH_4$ and air.

[4] The electrical apparatus according to any one of [1] to [3], in which the sealing member includes at least one selected from the group consisting of the hydrogenated nitrile rubber, the vinylidene fluoride based fluororubber, the tetrafluoroethylene-perfluorovinylether based rubber and the polytetrafluoroethylene.

[5] A filling apparatus for filling an insulating arc-extinguishing gas into the grounded tank of the electrical apparatus according to any one of [1] to [4], in which:
  the insulating arc-extinguishing gas is confined in the filling apparatus by a sealing member;
  the insulating arc-extinguishing gas includes at least one selected from the group consisting of a hydrofluoroolefin having 3 or 4 carbon atoms and a hydrochlorofluoroolefin having 3 or 4 carbon atoms; and
  the sealing member includes at least one selected from the group consisting of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber, a tetrafluoroethylene-perfluorovinylether based rubber and a polytetrafluoroethylene.

[6] The filling apparatus according to [5], in which the insulating arc-extinguishing gas includes at least one selected from the group consisting of 1-chloro-2,3,3,3-tetrafluoropropene and 1,1,1,4,4,4-hexafluoro-2-butene.

[7] The filling apparatus according to [5] or [6], in which the insulating arc-extinguishing gas further includes at least one diluent gas selected from the group consisting of He, Ar, $CO_2$, $N_2$, $O_2$, $N_2O$, $CH_4$ and air.

[8] The filling apparatus according to any one of [5] to [7], in which the sealing member includes at least one selected from the group consisting of the hydrogenated nitrile rubber, the vinylidene fluoride based fluororubber, the tetrafluoroethylene-perfluorovinylether based rubber and the polytetrafluoroethylene.

[9] A storage apparatus for storing an insulating arc-extinguishing gas to be filled in the grounded tank of the electrical apparatus according to any one of [1] to [4], in which:

the insulating arc-extinguishing gas is confined in the storage apparatus by a sealing member;

the insulating arc-extinguishing gas includes at least one selected from the group consisting of a hydrofluoroolefin having 3 or 4 carbon atoms and a hydrochlorofluoroolefin having 3 or 4 carbon atoms; and the sealing member includes at least one selected from the group consisting of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber, a tetrafluoroethylene-perfluorovinylether based rubber and a polytetrafluoroethylene.

[10] The storage apparatus according to [9], in which the insulating arc-extinguishing gas includes at least one selected from the group consisting of 1-chloro-2,3,3,3-tetrafluoropropene and 1,1,1,4,4,4-hexafluoro-2-butene.

[11] The storage apparatus according to [9] or [10], in which the insulating arc-extinguishing gas further includes at least one diluent gas selected from the group consisting of He, Ar, $CO_2$, $N_2$, $O_2$, $N_2O$, $CH_4$ and air.

[12] The storage apparatus according to any one of [9] to [11], in which the sealing member includes at least one selected from the group consisting of the hydrogenated nitrile rubber, the vinylidene fluoride based fluororubber, the tetrafluoroethylene-perfluorovinylether based rubber and the polytetrafluoroethylene.

Advantageous Effects of Invention

According to the present disclosure, it is possible to provide an electrical apparatus in which leakage of insulating arc-extinguishing gas from a grounded tank and influence on sealing members are reduced.

In addition, according to the present disclosure, it is possible to provide a filling apparatus for filling the insulating arc-extinguishing gas into the grounded tank of the electrical apparatus, and a storage apparatus for storing the insulating arc-extinguishing gas to be filled in the grounded tank of the electrical apparatus.

DESCRIPTION OF EMBODIMENTS

Figure 1:
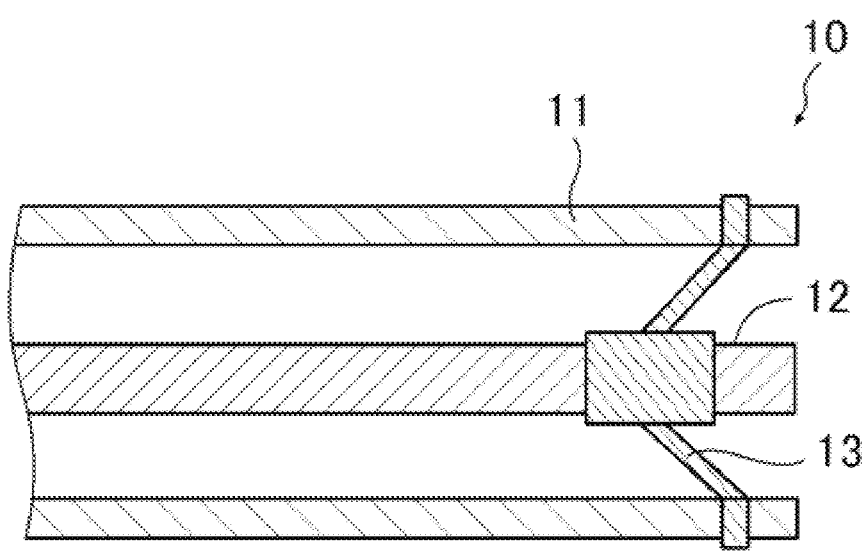
FIG. 1 is a partial cross-sectional view showing a configuration example of an electrical apparatus in the present disclosure.

Embodiments in the present disclosure will be described below with reference to the drawings. However, embodiments in the present disclosure are not limited to the aspects described in the drawings.

(Electrical Apparatus)

An electrical apparatus in the present disclosure has a grounded tank having a conductor at an inside thereof, and an atmosphere around the conductor in the grounded tank is filled with an insulating arc-extinguishing gas.

FIG. 1 is a partial cross-sectional view showing a configuration example of an electrical apparatus in the present disclosure. FIG. 1 shows a gas-insulated switchgear as an example of a gas electric apparatus.

An electrical apparatus 10 shown in FIG. 1 has a grounded tank 11 in which a conductor 12 is placed at an inside thereof.

In FIG. 1, the conductor 12 is supported by the support member 13 while being insulated from the grounded tank 11. The grounded tank 11 is, for example, an airtight container made of metal or the like, space, or the like. A high voltage is applied to the conductor 12. Therefore, the atmosphere around the conductor 12 is filled with an insulating arc-extinguishing gas (not shown). The insulating arc-extinguishing gas (not shown) is confined within the grounded tank 11 by a sealing member (not shown).

Figure 2:
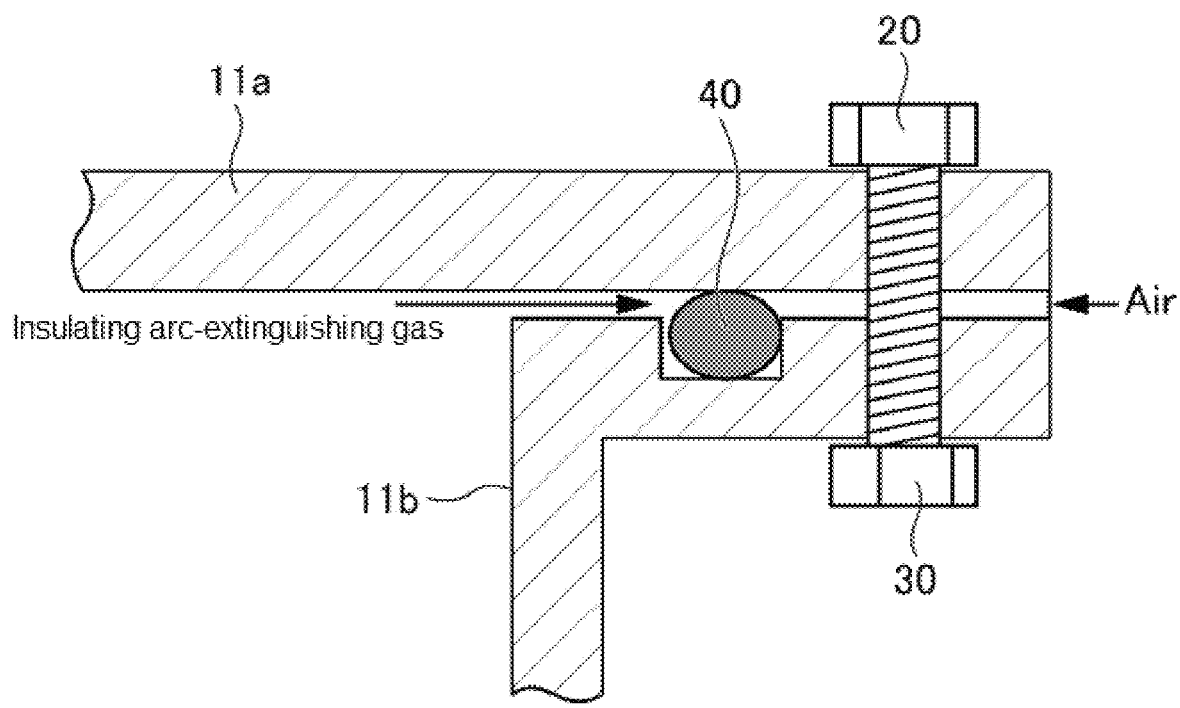
FIG. 2 is a partial cross-sectional view showing a configuration example of a sealing member of an electrical apparatus in the present disclosure.

FIG. 2 is a partial cross-sectional view showing a configuration example of a sealing member of the electrical apparatus 10 shown in FIG. 1. In FIG. 2, the members 11a and 11b constituting the grounded tank 11 are fixed with bolt 20 and nut 30, and an O-ring 40 having a circular cross section is used as a sealing member. This prevents the insulating arc-extinguishing gas from leaking, and prevents a gas from entering from the outside.

However, the sealing member of the electrical apparatus in the present disclosure is not limited to the above embodiment, and various sealing members used for gas sealing purposes, such as packing and gaskets, can also be used. Also, the cross-sectional shape of the sealing member may be, for example, X-shaped, rectangular, or the like.

The insulating arc-extinguishing gas in the present disclosure includes at least one selected from the group consisting of hydrofluoroolefins having 3 or 4 carbon atoms and hydrochlorofluoroolefins having 3 or 4 carbon atoms. These are olefins with double bonds between carbon atoms. Therefore, they have a short lifetime in the atmosphere. In addition, HFO and HCFO are presumed to have high insulating arc-extinguishing performance because they have halogen atoms in their molecular structures.

Examples of HFO having 3 or 4 carbon atoms include 1,1,1,4,4,4-hexafluoro-2-butene (hereinafter also referred to as HFO-1336mzz), 2,3,3,4,4,4-hexafluoro-1-butene (hereinafter also referred to as HFO-1336mcyf), 1,3,3,4,4,4-hexafluoro-1-butene (hereinafter also referred to as HFO-1336ze), tetrafluorobutene (hereinafter also referred to as HFO-1354), 2-fluoropropene (hereinafter also referred to as HFO-1261yf), 3,3-difluoropropene (hereinafter also referred to as HFO-1252zf), 1,1,2-trifluoropropene (hereinafter also referred to as HFO-1243yc), 1,2,3-trifluoropropene (hereinafter also referred to as HFO-1243ye), 2,3,3-trifluoropropene (hereinafter referred to as HFO-1243yf), 1,1,3-trifluoropropene (hereinafter also referred to as HFO-1243zc), 1,3,3-trifluoropropene (hereinafter also referred to as HFO-1243ze), 3,3,3-trifluoropropene (hereinafter also referred to as HFO-1243zf), 1,3,3,3-tetrafluoropropene (hereinafter also referred to as HFO-1234ze), 1,1,2,3-tetrafluoropropene (hereinafter also referred to as, also referred to as HFO-1234yc), 2,3,3,3-tetrafluoropropene (hereinafter also referred to as HFO-1234yf), 1,2,3,3-tetrafluoropropene (hereinafter also referred to as HFO-1234ye), 1,1,3,3-tetrafluoropropene (hereinafter also referred to as HFO-1234zc), 1,1,1,3,3-pentafluoropropene (hereinafter also referred to as HFO-1225ye), 1,1,2,3,3-pentafluoropropene (hereinafter also referred to as HFO-1225yc) and 1,1,3,3,3-pentafluoropropene (hereinafter also referred to as HFO-1225zc). Among these, HFO-1336mzz is preferred. HFO having 3 or 4 carbon atoms may be used singly or in combination of two or more.

Since a high voltage is applied to the conductor 12 when the electrical apparatus 10 is used, the inside of the grounded tank 11 becomes high temperature. Since the HFO exemplified above have stereoisomers, an isomerization reaction of HFO may progress during use of the electrical apparatus 10. In a case in which the progress of the isomerization reaction of HFO can be suppressed, the insulation arc-extinguishing performance tends to be maintained, and the safety of electrical apparatus tends to be excellent. For example, an increase in a boiling point of HFO due to isomerization is suppressed, and an increase in condensation temperature is suppressed, thereby suppressing deterioration in insulating arc-extinguishing performance due to liquefaction within the grounded tank 11. In addition, a decrease in the boiling point of HFO due to isomerization is suppressed, and an increase in the pressure in the grounded tank 11 is suppressed, whereby safety in designing the apparatus is excellent.

With HFO-1336mzz, the isomerization reaction hardly progresses when the electrical apparatus 10 is used, so the insulating arc-extinguishing performance is easily maintained, and the safety of the electrical apparatus tends to be excellent.

HFO-1336mzz is known to have stereoisomers, and the boiling point of the Z isomer of HFO-1336mzz (hereinafter also referred to as HFO-1336mzz (Z)) is 33° C., and the boiling point of the E isomer (hereinafter also referred to as HFO-1336mzz (E)) is 7.5° C. A mixture of HFO-1336mzz (Z) and HFO-1336mzz(E) is obtained by known production methods, and the two can be separated by distillation.

In a case in which HFO-1336mzz is used as the insulating arc-extinguishing gas, only one of Z isomer and E isomer may be used, or a mixture containing Z isomer and E isomer may be used.

In a case in which only one of the Z isomer and the E isomer is used, HFO-1336mzz (E), which has a higher boiling point, is less likely to liquefy in the grounded tank 11 and is preferable.

In a case in which a mixture containing the Z isomer and the E isomer is used, it is preferable to use an isomer mixture with a high proportion of HFO-1336mzz (E) in consideration of suppression of liquefaction. In a case in which an isomer mixture is used, a mass ratio (E/Z ratio), which is represented by HFO-1336mzz (E)/HFO-1336mzz (Z) in a total mass of HFO-1336mzz filled as the insulating arc-extinguishing gas, is preferably from 99/1 to 50/50.

HFO-1336mzz can be prepared by contacting $CF_3$—$CCl$=$CCl$—$CF_3$ with hydrogen in the presence of a catalyst, as disclosed in, for example, U.S. Pat. Nos. 7,795,482 and 8,399,721.

HFO-1336mzz can also be prepared by contacting $CF_3$—$CHCl_2$ with copper in the presence of an amide solvent and 2,2'-bipyridine, as disclosed in U.S. Pat. No. 8,436,216.

HFO-1336mzz can also be prepared by: (1) contacting $CCl_3$—$CF_3$ with hydrogen in the presence of a catalyst containing ruthenium to obtain 1316mxx (2,3-dichloro-1,1,1,4,4,4-hexafluoro-2-butene; (2) contacting 1316mxx with hydrogen in the presence of a catalyst including copper, nickel, copper-nickel, or copper-palladium to obtain E- or Z-1326mxz (1,1,1,4,4,4-hexafluoro-2-chloro-2-butene); (3) contacting 1326mxz with an aqueous solution of an alkali metal hydroxide in the presence of a quaternary alkylammonium salt to obtain a mixture including hexafluoro-2-butyne; and (4) contacting hexafluoro-2-butyne with hydrogen and a catalyst, which is disclosed in WO2015/120250.

Examples of HCFO having 3 or 4 carbon atoms include 1-chloro-2,3,3,3-tetrafluoropropene (hereinafter also referred to as HCFO-1224yd), 1-chloro-3,3,3-trifluoropropene (hereinafter also referred to as HCFO-1233zd), 2-chloro-1,1,3-trifluoropropene (hereinafter also referred to as HCFO-1233xc), 2-chloro-1,3,3-trifluoropropene (hereinafter also referred to as HCFO-1233xe), 2-chloro-3,3,3-trifluoropropene (hereinafter also referred to as HCFO-1233xf), 1-chloro-1,2,3-trifluoropropene (hereinafter referred to as Also referred to as HCFO-1233yb), 3-chloro-1,1,2-trifluoropropene (hereinafter also referred to as HCFO-1233yc), 1-chloro-2,3,3-trifluoropropene (hereinafter referred to as HCFO-1233yd), 3-chloro-1,2,3-trifluoropropene (hereinafter also referred to as HCFO-1233ye), 3-chloro-2,3,3-trifluoropropene (hereinafter also referred to as HCFO-1233yf), 1-chloro-1,3,3-trifluoropropene (hereinafter also referred to as HCFO-1233zb), 3-chloro-1,1,3-trifluoropropene (hereinafter also referred to as HCFO-1233zc), 3-chloro-1,3,3-trifluoropropene (hereinafter also referred to as HCFO-1233ze), 1,2-dichloro-3,3,3-trifluoropropene (HCFO-1223xd), 2,3-dichloro-3,3-difluoropropene (hereinafter also referred to as HCFO-1232xf), 2,3,3-trichloro-3-fluoropropene (HCFO-1231xf), 2-chloro-1,1,3,3-tetrafluoropropene (hereinafter also referred to as HCFO-1224xc), 2-chloro-1,3,3,3-tetrafluoropropene (hereinafter also referred to as HCFO-1224xe), 1,2,3-trichloro-3,3-difluoropropene (hereinafter also referred to as HCFO-1222xd) and 1-chloro-3,3,3-trifluoro-1-propyne ($CF_3$—C≡CCl). Among these, HCFO-1224yd is preferred. HCFO having 3 or 4 carbon atoms may be used singly or in combination of two or more.

HCFO-1224yd tends to suppress a progress of the isomerization reaction during use of the electrical apparatus 10.

HCFO-1224yd is known to have stereoisomers, and the Z isomer of HCFO-1224yd (hereinafter also referred to as HCFO-1224yd (Z)) has a boiling point of 15° C., and the E isomer of HCFO-1224yd (hereinafter also referred to as HCFO-1224yd (E)) has a boiling point of 17° C. A mixture of HCFO-1224yd (Z) and HCFO-1224yd (E) is obtained by known production methods, and the two can be separated by distillation.

In a case in which HCFO-1224yd is used as the insulating arc-extinguishing gas, only one of Z isomer and E isomer may be used, or a mixture containing Z isomer and E isomer may be used.

In a case in which only one of the Z isomer and the E isomer is used, HCFO-1224yd (Z) is less likely to liquefy in the grounded tank 11 and is preferable, considering the boiling point.

In a case in which a mixture containing the Z isomer and the E isomer is used, it is preferable to use an isomer mixture with a high proportion of HCFO-1224yd (Z) in consideration of suppression of liquefaction and productivity. In a case in which an isomer mixture is used, a mass ratio (Z/E ratio), which is represented by HCFO-1224yd (Z)/HCFO-1224yd (E) in the total mass of HCFO-1224yd filled as the insulating arc-extinguishing gas, is preferably from 99/1 to 50/50.

Methods for producing HCFO-1224yd include, for example, (1) a method of dehydrochlorination of 1,2-dichloro-2,3,3,3-tetrafluoropropane (hereinafter also referred to as HCFC-234bb); and (2) a method of hydrogen reduction of 1,1-dichloro-2,3,3,3-tetrafluoropropene (hereinafter also referred to as CFO-1214ya).

Each method is detailed below.
(1) Dehydrochlorination of HCFC-234bb

The dehydrochlorination of HCFC-234bb is carried out by contacting HCFC-234bb with a base dissolved in a solvent (that is, a base in solution state) in a liquid phase. HCFC-234bb can be produced, for example, by reacting 2,3,3,3-tetrafluoropropene (hereinafter also referred to as HFO-1234yf) with chlorine in a solvent.
(2) Hydrogen Reduction of CFO-1214ya CFO-1214ya is reduced to HFO-1234yf by reducing CFO-1214ya with hydrogen in the presence of a catalyst, and HCFO-1224yd is obtained as its intermediate. In addition to HCFO-1224yd, many types of fluorine-containing compounds are by-produced in this reduction reaction. There are known methods of producing CFO-1214ya, for example, by dehydrofluorinating 3,3-dichloro-1,1,1,2,2-pentafluoropropane or the like as a raw material in an alkaline aqueous solution in the presence of a phase transfer catalyst, or in a gas phase reaction in the presence of a catalyst such as chromium, iron, copper, activated carbon.

The insulating arc-extinguishing gas in the present disclosure preferably includes at least one selected from the group consisting of HCFO-1224yd and HFO-1336mzz, more preferably includes at least one selected from the group consisting of HCFO-1224yd (Z), HFO-1336mzz (Z), and HFO-1336mzz (E), and still more preferably includes at least one selected from the group consisting of HCFO-1224yd (Z) and HFO-1336mzz (E).

The insulating arc-extinguishing gas in the present disclosure may further contain at least one diluent gas selected from the group consisting of He, Ar, $CO_2$, $N_2$, $O_2$, $N_2O$, $CH_4$, and air.

When the insulating arc-extinguishing gas contains the diluent gas, a volume ratio of a total amount of HFO and HCFO based on a total amount of HFO, HCFO and a diluent gas is preferably 70% by volume or less, more preferably 60% by volume or less, even more preferably 50% by volume or less, even more preferably 40% by volume or less, even more preferably 30% by volume or less, even more preferably 25% by volume or less, even more preferably 20% by volume or less, even more preferably 15% by volume or less, even more preferably 10% by volume or les, and even more preferably 5% by volume or less, from the viewpoint of achieving a necessary condensation temperature for HFO and HCFO to exist only in the gas phase state. On the other hand, from the viewpoint of insulating arc-extinguishing performance, the volume ratio of the total amount of HFO and HCFO based on the total amount of HFO, HCFO and the diluent gas is preferably 1% by volume or more, more preferably 2% by volume or more, and even more preferably 3% by volume or more.

The sealing member in the present disclosure includes at least one selected from the group consisting of an ethylene propylene rubber (hereinafter also referred to as EPDM), an isobutylene-isoprene rubber (hereinafter also referred to as IIR), a chloroprene rubber (hereinafter also referred to as CR), a natural rubber (hereinafter also referred to as NR), a nitrile rubber (hereinafter also referred to as NBR), a hydrogenated nitrile rubber (hereinafter also referred to as HNBR), an urethane rubber (hereinafter also referred to as UR), a chlorosulfonated polyethylene rubber (hereinafter referred to as Hypalon (registered trademark) rubber, or CSM), a vinylidene fluoride based fluororubber (hereinafter also referred to as FKM), a tetrafluoroethylene-perfluorovinylether based rubber (hereinafter also referred to as FFKM), and a polytetrafluoroethylene (hereinafter also referred to as PTFE).

HFO having 3 or 4 carbon atoms and HCFO having 3 or 4 carbon atoms have a small GWP. Taking advantage of this advantage, by using the above material for the sealing member, the reaction between HFO having 3 or 4 carbon atoms or HCFO having 3 or 4 carbon atoms and the sealing member is suppressed, whereby, for example, the occurrence of swelling, shrinkage, elution or the like regarding the sealing member can be suppressed. As a result, a leakage of insulating arc-extinguishing gas from the grounded tank 11 is suppressed.

In addition, by using the sealing member material described above, the reaction between the HFO or HCFO included in the insulating arc-extinguishing gas and the sealing member material is suppressed so that a leakage of the insulating arc-extinguishing gas and the diluent gas from the grounded tank 11 is prevented, even when a diluent gas such as He, Ar, $CO_2$, $O_2$, $N_2$, $N_2O$, $CH_4$, air or the like are used together from the viewpoint of suppressing condensation and liquefaction under the usage of HFO and HCFO with high boiling points.

In a case in which HF or HCl is generated as a decomposition product from HFO or HCFO containing halogen atoms during use of the electrical apparatus 10, the use of the above-described sealing member may prevent the leakage of insulating arc-extinguishing gas from the grounded tank 11 and may reduce the impact on the sealing member.

The sealing member in the present disclosure preferably contains at least one selected from the group consisting of HNBR, FKM, FFKM and PTFE.

The electrical apparatus may include various apparatus electrically in series or in parallel along an electric line (electrical circuit) containing conductors. Examples of the apparatus include a switch, a circuit breaker, a disconnector or the like for cutting electric line; or a transformer, a resistor, a reactor, a capacitor or the like for changing a voltage of electric line.

For the internal or external insulation of apparatus such as a switch, a circuit breaker, a disconnector, a transformer, a resistor, a reactor, a capacitor or the like, an insulating arc-extinguishing gas filled inside a grounded tank may be used, or other insulating arc-quenching gases may be used. Other insulating arc-quenching gases include, for example, hydrogen, helium, $SF_6$, and mixtures thereof.

In addition, for the internal or external insulation of the apparatus, a solid insulator, an insulating oil, a gel insulator or the like may be used. The interior or exterior of the apparatus may be insulated by vacuum conditions.

Examples of the solid insulator include an insulating resin material. Examples of the insulating resin material include a thermoplastic resin and a thermosetting resin. Examples of the thermoplastic resin include a vinyl chloride based resin, a polyester based resin, and a nylon based resin. Examples of the thermosetting resin include an epoxy based resin or and a urethane based resin. Examples of the insulating oil include a mineral oil, a vegetable oil, an animal oil, and a fluorinated oil.

(Filling Apparatus)

The filling apparatus in the present disclosure is an apparatus for filling insulating arc-extinguishing gas into the grounded tank of the electrical apparatus in the present disclosure, in which the insulating arc-extinguishing gas is confined in the filling apparatus by a sealing member; the insulating arc-extinguishing gas includes at least one selected from the group consisting of a hydrofluoroolefin having 3 or 4 carbon atoms and a hydrochlorofluoroolefin having 3 or 4 carbon atoms; and the sealing member includes at least one selected from the group consisting of an ethylene propylene rubber, an isobutylene-isoprene rubber, a chloroprene rubber, a natural rubber, a nitrile rubber, a hydrogenated nitrile rubber, an urethane rubber, Hypalon (registered trademark) rubber, a vinylidene fluoride based fluororubber, a tetrafluoroethylene-perfluorovinylether based rubber, and a polytetrafluoroethylene.

Filling apparatus may have a container that contains insulating arc-extinguishing gas, a heating apparatus that heats the container containing the insulating arc-extinguishing gas, a pump that pressurizes the insulating arc-extinguishing gas, a pipe or a hose that connect to a tank of the electrical apparatus, on-off valve, a vacuum pump that evacuates an inside of the electrical apparatus, an adsorbent that absorbs moisture and decomposition gas, or the like. The filling apparatus in the present disclosure uses the above sealing member to confine the insulating arc-quenching gas.

The insulating arc-extinguishing gas in the filling apparatus is synonymous with that explained in the electrical apparatus. The sealing member in the filling apparatus is synonymous with that explained in the electrical apparatus.

(Storage Apparatus)

The storage apparatus in the present disclosure is an apparatus for storing the insulating arc-extinguishing gas to be filled in the grounded tank of the electrical apparatus in the present disclosure, in which the insulating arc-extinguishing gas is confined in the storage apparatus by the sealing member; the insulating arc-extinguishing gas includes at least one selected from the group consisting of a hydrofluoroolefin having 3 or 4 carbon atoms and a hydrochlorofluoroolefin having 3 or 4 carbon atoms; and the sealing member includes at least one selected from the group consisting of an ethylene propylene rubber, an isobutylene-isoprene rubber, a chloroprene rubber, a natural rubber, a nitrile rubber, a hydrogenated nitrile rubber, an urethane rubber, Hypalon (registered trademark) rubber, a vinylidene fluoride based fluororubber, a tetrafluoroethylene-perfluorovinylether based rubber and a polytetrafluoroethylene.

The storage apparatus in the present disclosure may have a tank that stores the insulating arc-extinguishing gas, an on-off valve or the like. The storage apparatus in the present disclosure uses the above sealing member to confine the insulating arc-quenching gas.

The insulating arc-extinguishing gas in the storage apparatus is synonymous with that explained in the electrical apparatus. The sealing member in the storage apparatus is synonymous with that explained in the electrical apparatus.

Example

Hereinafter, embodiments in the present disclosure will be described in detail with examples. Examples 1 to 3, 5, 6, 8, 9, 11 to 17, 19, 20, 22, 23, 25 to 32 are examples, and Examples 4, 7, 10, 18, 21, 24 are comparative examples. However, embodiments in the present disclosure are not limited to these examples.

(Gas Transmission Test)

Figure 3:
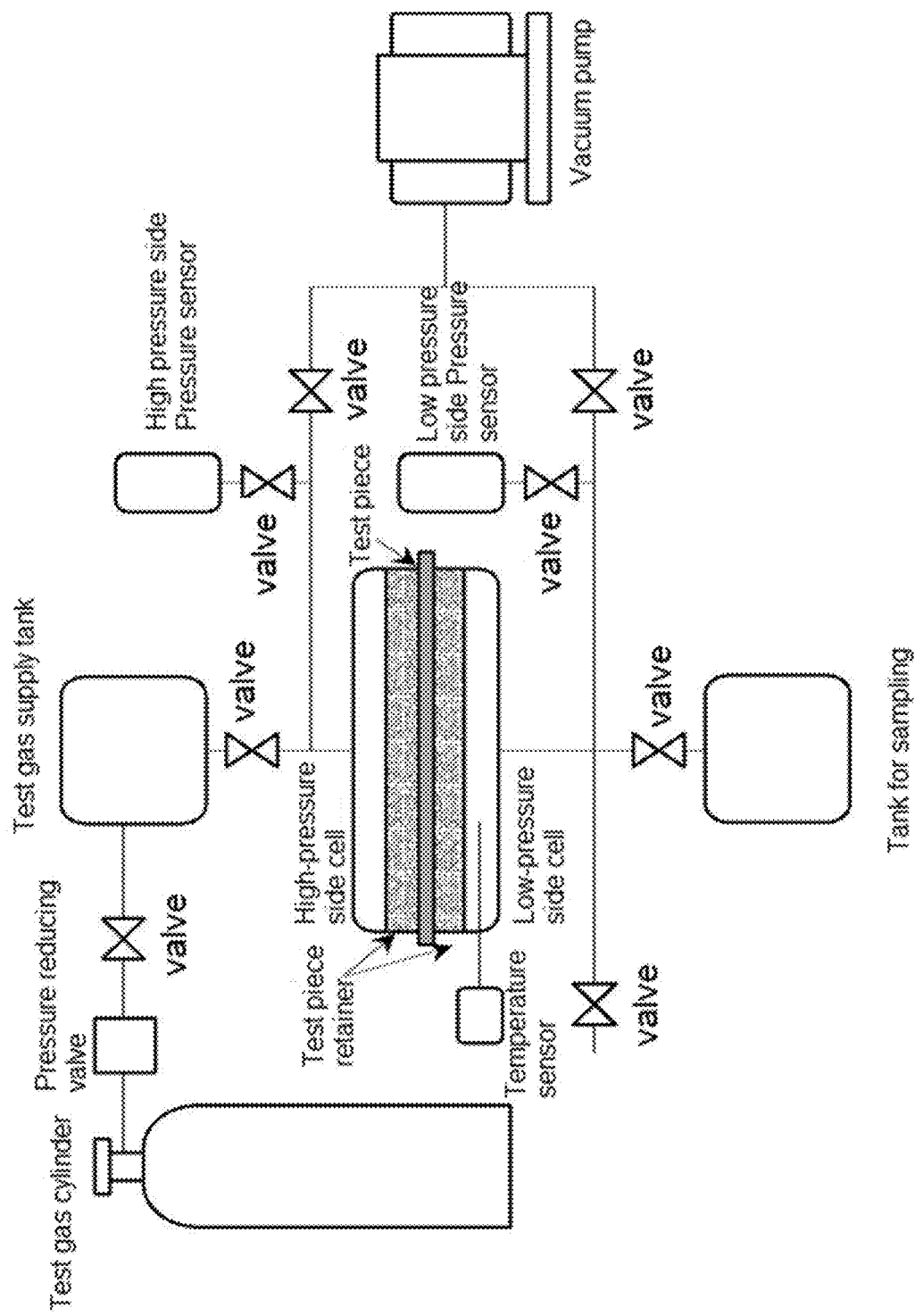
FIG. 3 is a figure of the apparatus used in the gas transmission test.

Using the device shown in FIG. 3, a gas transmission rate (GTR) was calculated using the following formula. HCFO-1224yd(Z), HFO-1336mzz(Z), or HFO-1336mzz(E) were used as test gases. FKM, FFKM, IIR, vinyl methyl silicone rubber (VMQ), EPDM, CR, acrylic rubber (ACM), NR, NBR, styrene-butadiene rubber (SBR), HNBR, UR, CSM, or PTFE were used as test pieces.

The gas transmission rate (GTR) is a number of moles of the test gas that transmits the test piece per unit area, unit time, and unit partial pressure between both sides of the test piece, and is expressed by the following formula.

$$GTR = \frac{V_c}{R \times T \times P_u \times A} \times \frac{dp}{dt}$$

GTR: Gas transmission rate [mol/(m²·s·Pa)]
$V_c$: Volume of low pressure side cell [m³]
R: Gas constant 8.31 [m³·Pa/(K·mol)]
T: Test temperature [K]
$P_u$: Pressure difference between high pressure side and low pressure side of test gas [Pa]
A: Gas transmission area [m²]
dp/dt: Pressure change in low-pressure side cell per unit time [Pa/s]

Of these parameters, $V_c$, T, $P_u$ and A are fixed values below.

$V_c$: $2.5 \times 10^{-6}$ [m³]
T: 323±2 [K]
$P_u$: 100000 [Pa]
A: $7.1 \times 10^{-4}$ [m²]

Figure 4:
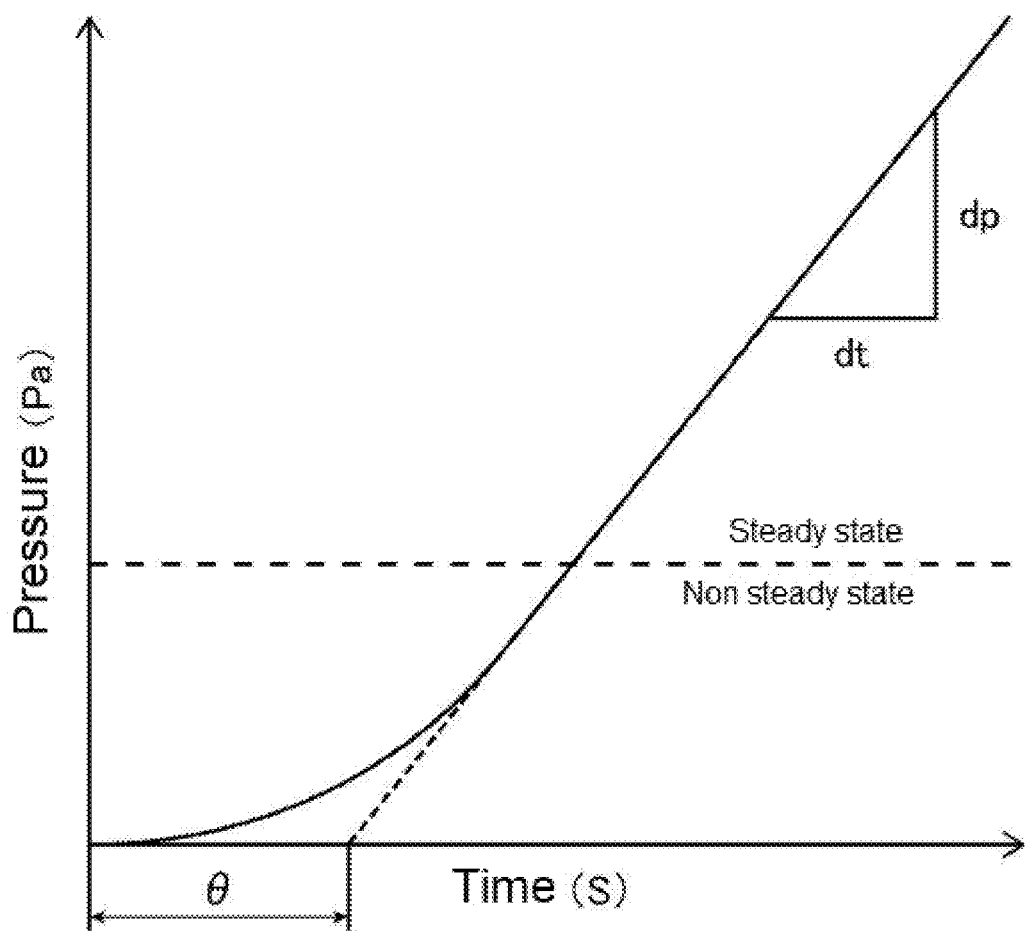
FIG. 4 is a figure showing a relationship between a test time and a pressure of a low pressure side cell in a gas transmission test.

FIG. 4 is a graph showing the relationship between the gas transmission test execution time and the pressure of the low-pressure side cell. As shown in FIG. 4, the pressure change per unit time in the low-pressure side cell increases after the start of the gas transmission test, and reaches a steady state after a specific period of time has passed. The dp/dt described above means a steady state value. In FIG. 4, the intersection of a straight line of dp/dt and an x-axis is indicated as time θ.

The gas transmission coefficient Q was calculated from the GTR calculated by the above procedure.

The gas transmission coefficient Q is a number of moles of the test gas that transmits the test piece per unit thickness, unit area, unit time, and unit partial pressure between both sides of the test piece, and is expressed by the following formula.

$$Q = GTR \times h$$

Q: Gas transmission coefficient [mol m/(m²·s·Pa)]
GTR: Gas transmission rate [mol/(m²·s·Pa)]
h: Average thickness of a test piece [m]
The average thickness of the test piece was $2.0 \times 10^{-3}$ [m].
The gas transmission coefficient $Q_R$ calculated using $SF_6$ as the test gas and using vinyl methyl silicone rubber (VMQ)

as the test piece was used as reference data. Based on the obtained relationship between the gas transmission coefficient Q and $Q_R$, the gas transmission of the test piece to the test gas was evaluated according to the following criteria.

A: Q is less than $0.1 \times Q_R$

B: Q is $0.1 \times Q_R$ or more and less than $0.3 \times Q_R$

C: Q is $0.3 \times Q_R$ or more and less than $1.0 \times Q_R$

D: Q is $1.0 \times Q_R$ or more (Material Affected Test)

A test piece (25 mm×30 mm×2 mm) was immersed in 60 g of liquefied test gas at 50° C. for 120 hours, and the volume change of the test piece was evaluated according to the following criteria.

A: No volume change or positive volume change (swelling) occurs at less than 20%

B: Positive volume change (swelling) occurs at 20% or more and less than 60%

C: Negative volume change (shrinkage) occurs at less than 5%, or positive volume change (swelling) occurs at 60% or more and less than 100%

D: Negative volume change (shrinkage) occurs at 5% or more, or positive volume change (swelling) occurs at 100% or more The results of the gas transmission test and material affected test were scored according to the following criteria.

A=1

B=2

C=3

D=4

The score of the gas transmission test and the score of the material affected test were added up, and the results of the total score were judged according to the following criteria, and shown in the "Judgment" column of Tables 1 to 3 below.

A=2 to 3

B=4 to 5

C=6 to 7

D=8 or more

However, in a case in which at least one of the results of the gas transmission test and the material affected test is D, the judgment is D.

The results are shown in Tables 1 to 3 below.

TABLE 1

| Example | Test Gas | Sealing Material | Gas Transmission Test | Material Affected test | Judgment |
|---|---|---|---|---|---|
| 1 | HCFO-1224yd(Z) | FKM | A | B | A |
| 2 | HCFO-1224yd(Z) | FFKM | A | B | A |
| 3 | HCFO-1224yd(Z) | IIR | A | C | B |
| 4 | HCFO-1224yd(Z) | VMQ | D | D | D |
| 5 | HCFO-1224yd(Z) | EPDM | B | A | A |
| 6 | HCFO-1224yd(Z) | CR | B | A | A |
| 7 | HCFO-1224yd(Z) | ACM | B | D | D |
| 8 | HCFO-1224yd(Z) | NR | B | C | B |
| 9 | HCFO-1224yd(Z) | NBR | A | C | B |
| 10 | HCFO-1224yd(Z) | SBR | C | C | C |
| 11 | HCFO-1224yd(Z) | HNBR | A | A | A |
| 12 | HCFO-1224yd(Z) | UR | B | B | B |
| 13 | HCFO-1224yd(Z) | CSM | A | A | A |
| 14 | HCFO-1224yd(Z) | PTFE | A | A | A |

TABLE 2

| Example | Test Gas | Sealing Material | Gas Transmission Test | Material Affected test | Judgment |
|---|---|---|---|---|---|
| 15 | HFO-1336mzz(Z) | FKM | A | B | A |
| 16 | HFO-1336mzz(Z) | FFKM | A | B | A |
| 17 | HFO-1336mzz(Z) | IIR | A | C | B |
| 18 | HFO-1336mzz(Z) | VMQ | D | A | D |
| 19 | HFO-1336mzz(Z) | EPDM | C | A | B |
| 20 | HFO-1336mzz(Z) | CR | B | C | B |
| 21 | HFO-1336mzz(Z) | ACM | C | D | D |
| 22 | HFO-1336mzz(Z) | NR | B | C | B |
| 23 | HFO-1336mzz(Z) | NBR | B | C | B |
| 24 | HFO-1336mzz(Z) | SBR | C | C | C |
| 25 | HFO-1336mzz(Z) | HNBR | A | A | A |
| 26 | HFO-1336mzz(Z) | UR | B | B | B |
| 27 | HFO-1336mzz(Z) | CSM | A | C | B |
| 28 | HFO-1336mzz(Z) | PTFE | A | A | A |

TABLE 3

| Example | Test Gas | Sealing Material | Gas Transmission Test | Material Affected test | Judgment |
|---|---|---|---|---|---|
| 29 | HFO-1336mzz(E) | FKM | A | B | A |
| 30 | HFO-1336mzz(E) | FFKM | A | B | A |
| 31 | HFO-1336mzz(E) | HNBR | A | A | A |
| 32 | HFO-1336mzz(E) | PTFE | A | A | A |

Examples 1 to 3, 5, 6, 8, 9, 11 to 17, 19, 20, 22, 23 and 25 to 32, which use FKM, FFKM, IIR, EPDM, CR, NR, NBR, HNBR, UR, CSM or PTFE as test pieces, had a judgment result of B or higher. Examples 1, 2, 11, 14 to 16, 25 and 28 to 32, which use FKM, FFKM, HNBR or PTFE as the test piece, had a judgment result of A. In Example 4 using VMQ as the test piece, both the gas transmission test and material affected test resulted in D, and the judgment result was D. In Example 18 using VMQ as the test piece, the result of the material affected test was A, but the result of the gas transmission test was D, and the judgment result was D. In Example 7 using ACM as the test piece, the result of the gas transmission test was B, but the result of the material affected test was D, and the judgment result was D. In Example 21 using ACM as the test piece, the result of the gas transmission test was C, but the result of the material affected test was D, and the judgment result was D.

From the above results, in a case in which at least one selected from the group consisting of hydrofluoroolefins having 3 or 4 carbon atoms and hydrochlorofluoroolefins having 3 or 4 carbon atoms is used as insulating arc-extinguishing gases for grounded tanks of electrical apparatus, use of FKM, FFKM, IIR, EPDM, CR, NR, NBR, HNBR, UR, CSM, or PTFE as the sealing member may prevent leakage of insulating arc-extinguishing gas from the grounded tank and may reduce the impact on the sealing member. Use of FKM, FFKM, HNBR or PTFE as the sealing member may more effectively prevent leakage of insulating arc-extinguishing gas from the grounded tank and may more effectively reduce the impact on the sealing member.

The entire contents of the disclosures by Japanese Patent Application No. 2020-208467 are incorporated herein by reference.

All publications, patent applications, and technical standards mentioned in this specification are herein incorporated by reference to the same extent as if each individual publication, patent application, or technical standard was specifically and individually indicated to be incorporated by reference.

EXPLANATION OF REFERENCES

10: Electric apparatus
11: Grounded tank
11a, 11b: Members
12: Conductor
13: Support member
20: Volts
30: Nut
40: O-ring

The invention claimed is:

1. An electrical apparatus comprising a grounded tank having a conductor at an inside thereof, wherein:
the grounded tank is filled inside with an insulating arc-extinguishing gas;
an atmosphere around the conductor in the grounded tank is filled with the insulating arc-extinguishing gas;
the insulating arc-extinguishing gas is confined in the grounded tank by a first grounded tank sealing member;
the insulating arc-extinguishing gas comprises 1-chloro-2,3,3,3-tetrafluoropropene; and
the grounded tank sealing member comprises at least one of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber, a tetrafluoroethylene-perfluorovinylether based rubber and a polytetrafluoroethylene.

2. The electrical apparatus according to claim 1, wherein the insulating arc-extinguishing gas further comprises at least one diluent gas selected from He, Ar, $CO_2$, $N_2$, $O_2$, $N_2O$, $CH_4$ and air.

3. The electrical apparatus according to claim 1, wherein the grounded tank sealing member comprises at least one of the hydrogenated nitrile rubber, the vinylidene fluoride based fluororubber, the tetrafluoroethylene-perfluorovinylether based rubber and the polytetrafluoroethylene.

4. A filling apparatus for filling an insulating arc-extinguishing gas into the grounded tank of the electrical apparatus according to claim 1, wherein:
the insulating arc-extinguishing gas is confined in the filling apparatus by a filling apparatus sealing member;
the insulating arc-extinguishing gas comprises 1-chloro-2,3,3,3-tetrafluoropropene; and
the filling apparatus sealing member comprises at least one of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber, a tetrafluoroethylene-perfluorovinylether based rubber and a polytetrafluoroethylene.

5. The filling apparatus according to claim 4, wherein the insulating arc-extinguishing gas further comprises at least one diluent gas selected from He, Ar, $CO_2$, $N_2$, $O_2$, $N_2O$, $CH_4$ and air.

6. The filling apparatus according to claim 4, wherein the filling apparatus sealing member comprises at least one of the hydrogenated nitrile rubber, the vinylidene fluoride based fluororubber, the tetrafluoroethylene-perfluorovinylether based rubber and the polytetrafluoroethylene.

7. A storage apparatus for storing an insulating arc-extinguishing gas to be filled in the grounded tank of the electrical apparatus according to claim 1, wherein:
the insulating arc-extinguishing gas is confined in the storage apparatus by a storage apparatus sealing member;
the insulating arc-extinguishing gas comprises 1-chloro-2,3,3,3-tetrafluoropropene; and
the storage apparatus sealing member comprises at least one of an ethylene propylene rubber, an isobutylene-isoprene rubber, a chloroprene rubber, a natural rubber, a nitrile rubber, a hydrogenated nitrile rubber, an urethane rubber, a chlorosulfonated polyethylene rubber, a vinylidene fluoride based fluororubber, a tetrafluoroethylene-perfluorovinylether based rubber and a polytetrafluoroethylene.

8. The storage apparatus according to claim 7, wherein the insulating arc-extinguishing gas further comprises at least one diluent gas selected from He, Ar, $CO_2$, $N_2$, $O_2$, $N_2O$, $CH_4$ and air.

9. The storage apparatus according to claim 7, wherein the storage apparatus sealing member comprises at least one of the hydrogenated nitrile rubber, the vinylidene fluoride based fluororubber, the tetrafluoroethylene-perfluorovinylether based rubber and the polytetrafluoroethylene.

* * * * *